United States Patent
Clement et al.

(10) Patent No.: US 12,321,735 B2
(45) Date of Patent: Jun. 3, 2025

(54) SYNTAX UNIT TESTING AND FINE-TUNING OF NEURAL TRANSCOMPILATION MODELS

(71) Applicant: MICROSOFT TECHNOLOGY LICENSING, LLC., Redmond, WA (US)

(72) Inventors: Colin Bruce Clement, Seattle, WA (US); Yufan Huang, Shanghai (CN); Neelakantan Sundaresan, Bellevue, WA (US); Yiding Tian, Shanghai (CN); Maoquan Wang, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 18/088,492

(22) Filed: Dec. 23, 2022

(65) Prior Publication Data
US 2024/0211224 A1 Jun. 27, 2024

(51) Int. Cl.
*G06F 8/51* (2018.01)
*G06F 8/41* (2018.01)
*G06N 3/08* (2023.01)

(52) U.S. Cl.
CPC ............... *G06F 8/51* (2013.01); *G06F 8/41* (2013.01); *G06N 3/08* (2013.01)

(58) Field of Classification Search
CPC ............... G06F 8/41; G06F 8/51; G06N 3/08
USPC .................................. 717/136–137, 143–144
See application file for complete search history.

(56) References Cited

U.S. PATENT DOCUMENTS

| | | | |
|---|---|---|---|
| 10,140,105 B2* | 11/2018 | Kellicker | G06F 8/51 |
| 2022/0066747 A1* | 3/2022 | Drain | G06N 5/046 |
| 2022/0308848 A1* | 9/2022 | Clement | G06N 3/045 |

OTHER PUBLICATIONS

Zhang et al., "Accelerating Neural Transformer via an Average Attention Network", 2018, the Association for Computational Linguistics, pp. 1789-1798. (Year: 2018).*
"Tree-sitter—Introduction", Retrieved From: https://tree-sitter.github.io/tree-sitter/, Retrieved From: Jul. 20, 2022, 3 Page.
"Unittest—Unit Testing Framework", Retrieved From: https://docs.python.org/3/library/unittest.html, Dec. 25, 2022, 35 Pages.
Aggarwal, et al., "Using Machine Translation for Converting Python 2 to Python 3 Code", In PeerJ Preprints, vol. 3, Oct. 29, 2015, 4 Pages.

(Continued)

*Primary Examiner* — Ted T. Vo

(57) ABSTRACT

A neural transcompilation model is tested with a set of syntax unit tests to determine the syntax elements of a source code program written in a source programming language that fail to translate properly into a target programming language. The syntax elements having a translation defect are identified and ranked according to a translation failure rate. The neural transcompilation model is then fine-tuned with training samples of the syntax elements having the highest translation failure rates and their paired correct translation in order to teach the model to learn the association between the syntax elements of a source programming language causing translation defects and its correct translation in a target programming language.

20 Claims, 7 Drawing Sheets

(56) References Cited

OTHER PUBLICATIONS

Ahmad, et al., "Unified Pre-training for Program Understanding and Generation", In Proceedings of the Conference of the North American Chapter of the Association for Computational Linguistics, Jul. 6, 2021, pp. 2655-2668.

Austin, et al., "Program Synthesis with Large Language Models", In Repository of arXiv:2108.07732v1, Aug. 16, 2021, 34 Pages.

Brockschmidt, et al., "Generative Code Modeling with Graphs", In Proceedings of the 7th International Conference on Learning Representations, May 6, 2019, 24 Pages.

Chandel, et al., "Training and Evaluating a Jupyter Notebook Data Science Assistant", In Repository of arXiv:2201.12901v1, Jan. 30, 2022, 8 Pages.

Chen, et al., "Evaluating Large Language Models Trained on Code", In Repository of arXiv:2107.03374v2, Jul. 14, 2021, 35 Pages.

Chen, et al., "Tree-to-tree Neural Networks for Program Translation", In Proceedings of Advances in Neural Information Processing Systems, Dec. 3, 2018, 11 Pages.

Clement, et al., "PYMT5: Multi-mode Translation of Natural Language and PYTHON Code with Transformers", In Proceedings of the Conference on Empirical Methods in Natural Language Processing, Nov. 16, 2020, pp. 9052-9065.

Conneau, et al., "Cross-lingual Language Model Pretraining", In Proceedings of Advances in Neural Information Processing Systems, Dec. 8, 2019, 11 Pages.

Devlin, et al., "BERT: Pre-training of Deep Bidirectional Transformers for Language Understanding", In Proceedings of the Conference of the North American Chapter of the Association for Computational Linguistics: Human Language Technologies, Jun. 2, 2019, pp. 4171-4186.

Feng, et al., "CodeBERT: A Pre-Trained Model for Programming and Natural Languages", In Proceedings of Findings of the Association for Computational Linguistics, Nov. 16, 2020, pp. 1536-1547.

Gu, et al., "Deep Code Search", In Proceedings of ACM/IEEE 40th International Conference on Software Engineering, May 27, 2018, pp. 933-944.

Guo, et al., "GraphCodeBERT: Pre-Training Code Representations with Data Flow", In Proceedings of the 9th International Conference on Learning Representations, May 3, 2021, 18 Pages.

Guo, et al., "Learning To Complete Code with Sketches", In Proceedings of International Conference on Learning Representations, Sep. 29, 2021, 23 Pages.

Hill, et al., "Automatically Capturing Source Code Context of NL-Queries for Software Maintenance and Reuse", In Proceedings of IEEE 31st International Conference on Software Engineering, May 16, 2009, pp. 232-242.

Jakob, Wenzel, "Pybind11", Retrieved From: https://pybind11.readthedocs.io/en/stable/, Retrieved From: Jul. 20, 2021, 6 Pages.

Kanade, et al., "Learning and Evaluating Contextual Embedding of Source Code", In Proceedings of the 37th International Conference on Machine Learning, Jul. 13, 2020, 12 Pages.

Keivanloo, et al., "Spotting Working Code Examples", In Proceedings of the 36th International Conference on Software Engineering, Jun. 1, 2014, 12 Pages.

Kingma, et al., "ADAM: A Method for Stochastic Optimization", In Repository of arXiv:1412.6980v5, Apr. 23, 2015, 13 Pages.

Koehn, et al., "Moses: Open Source Toolkit for Statistical Machine Translation", In Proceedings of the 45th Annual Meeting of the Association for Computational Linguistics, Jun. 23, 2007, pp. 177-180.

Lachaux, et al., "DOBF: A Deobfuscation Pre-Training Objective for Programming Languages", In Proceedings of Advances in Neural Information Processing Systems, Dec. 6, 2021, 13 Pages.

Lample, et al., "Phrase-Based & Neural Unsupervised Machine Translation", In Repository of arXiv:1804.07755v2, Aug. 13, 2018, 14 Pages.

Lewis, et al., "BART: Denoising Sequence-to-Sequence Pre-training for Natural Language Generation, Translation, and Comprehension", In Proceedings of the 58th Annual Meeting of the Association for Computational Linguistics, Jul. 5, 2022, pp. 7871-7880.

Lu, et al., "CodeXGLUE: A Machine Learning Benchmark Dataset for Code Understanding and Generation", In Proceedings of the 35th Conference on Neural Information Processing Systems Track on Datasets and Benchmarks, Dec. 2021, 16 Pages.

Mastropaolo, et al., "Studying the Usage of Text-To-Text Transfer Transformer to Support Code-Related Tasks", In Proceedings of IEEE/ACM 43rd International Conference on Software Engineering, May 22, 2021, pp. 336-347.

McMillan, et al., "Recommending Source Code for Use in Rapid Software Prototypes", In Proceedings of IEEE 34th International Conference on Software Engineering, Jun. 2, 2012, pp. 848-858.

Menard, et al., "JPype Documentation", Retrieved From: https://jpype.readthedocs.io/en/latest/, Retrieved From: Jul. 20, 2021, 4 Pages.

Nguyen, et al., "Learning API Usages from Bytecode: A Statistical Approach", In Proceedings of IEEE/ACM 38th International Conference on Software Engineering, May 14, 2016, pp. 416-427.

Nguyen, et al., "Lexical Statistical Machine Translation for Language Migration", In Proceedings of the 9th Joint Meeting of the European Software Engineering Conference and the ACM SIGSOFT Symposium on the Foundations of Software Engineering, Aug. 18, 2013, pp. 651-654.

Papineni, et al., "BLEU: a Method for Automatic Evaluation of Machine Translation", In Proceedings of the 40th Annual Meeting of the Association for Computational Linguistics, Jul. 6, 2002, 8 Pages.

Rabinovich, et al., "Abstract Syntax Networks for Code Generation and Semantic Parsing", In Proceedings of the 55th Annual Meeting of the Association for Computational Linguistics, Jul. 30, 2017, pp. 1139-1149.

Ren, et al., "CodeBLEU: a Method for Automatic Evaluation of Code Synthesis", In Repository of arXiv:2009.10297v2, Sep. 27, 2020, 8 Pages.

Rozière, et al., "Unsupervised Translation of Programming Languages", In Advances in Neural Information Processing Systems, vol. 33, Dec. 6, 2020, 11 Pages.

Rozière, et al., "Leveraging Automated Unit Tests for Unsupervised Code Translation", In Repository of arXiv:2110.06773v2, Feb. 16, 2022, 20 Pages.

Scholak, et al., "PICARD: Parsing Incrementally for Constrained Auto-Regressive Decoding from Language Models", In Repository of arXiv:2109.05093v1, Sep. 10, 2021, 7 Pages.

Sennrich, et al., "Improving Neural Machine Translation Models with Monolingual Data", In Proceedings of the 54th Annual Meeting of the Association for Computational Linguistics, Aug. 7, 2016, pp. 86-96.

Sun, et al., "Code Search based on Context-aware Code Translation", In Repository of arXiv:2202.08029v1, Feb. 16, 2022, 13 Pages.

Szafraniec, et al., "Code Translation with Compiler Representations", In Repository of arXiv:2207.03578v3, Oct. 18, 2022, 18 Pages.

Tufano, et al., "On Learning Meaningful Code Changes via Neural Machine Translation", In Proceedings of IEEE/ACM 41st International Conference on Software Engineering, May 25, 2019, pp. 25-36.

Vincent, et al., "Extracting and Composing Robust Features with Denoising Autoencoders", In Proceedings of the Twenty-Fifth International Conference on Machine Learning, Jun. 5, 2008, 8 Pages.

Xue, et al., "Accurate and Scalable Cross-Architecture Cross-OS Binary Code Search with Emulation", In Journal of IEEE Transactions on Software Engineering, vol. 45, Issue 11, Nov. 12, 2019, pp. 1125-1149.

Yin, et al., "A Syntactic Neural Model for General-Purpose Code Generation", In Proceedings of the 55th Annual Meeting of the Association for Computational Linguistics, Jul. 30, 2017, pp. 440-450.

(56) References Cited

OTHER PUBLICATIONS

Zhu, et al., "Multilingual Code Snippets Training for Program Translation", In Proceedings of The Thirty-Sixth AAAI Conference on Artificial Intelligence, Feb. 22, 2022, pp. 11783-11790.

* cited by examiner

400

```
START
  ↓
┌─────────────────────────────────────────────────────────────────────┐
│ DO FOR EACH SOURCE CODE PROGRAM OF EACH OF THE SYNTAX UNIT TESTS 402│
│  ┌───────────────────────────────────────────────────────────────┐  │
│  │ GENERATE CONCRET SYNTAX TREE FOR THE SOURCE CODE PROGRAM  404 │  │
│  └───────────────────────────────────────────────────────────────┘  │
│  ┌───────────────────────────────────────────────────────────────┐  │
│  │ INITIALIZE MATRIX Aij FOR EACH SYNTAX ELEMENT IN CONCRETE     │  │
│  │ SYNTAX TREE  406                                              │  │
│  └───────────────────────────────────────────────────────────────┘  │
│  ┌───────────────────────────────────────────────────────────────┐  │
│  │ DO FOR EACH UNIT TEST CASE i   408                            │  │
│  │  ┌─────────────────────────────────────────────────────────┐  │  │
│  │  │ EXECUTE NEURAL TRANSCOMPILER WITH SOURCE CODE PROGRAM   │  │  │
│  │  │ TO GENERATE TRANSLATION  410                            │  │  │
│  │  └─────────────────────────────────────────────────────────┘  │  │
│  │  ┌─────────────────────────────────────────────────────────┐  │  │
│  │  │ TEST TRANSLATED CODE WITH INPUT VALUES AND COMPARE      │  │  │
│  │  │ OUTPUT WITH EXPECTED OUTPUT  412                        │  │  │
│  │  └─────────────────────────────────────────────────────────┘  │  │
│  │  ┌─────────────────────────────────────────────────────────┐  │  │
│  │  │ IF TEST PASSED, SET Yi = 1 ELSE Yi = 0   414            │  │  │
│  │  └─────────────────────────────────────────────────────────┘  │  │
│  └───────────────────────────────────────────────────────────────┘  │
└─────────────────────────────────────────────────────────────────────┘
  ↓
┌─────────────────────────────────────────────────────────────────────┐
│ DETERMINE FAIL RATE OF EACH SYNTAX ELEMENT BASED ON Y=AX   416      │
└─────────────────────────────────────────────────────────────────────┘
  ↓
┌─────────────────────────────────────────────────────────────────────┐
│ RANK SYNTAX ELEMENTS BASED ON HIGHEST FAIL RATE   418               │
└─────────────────────────────────────────────────────────────────────┘
  ↓
┌─────────────────────────────────────────────────────────────────────┐
│ SELECT TOP-K SYNTAX ELEMENTS WITH HIGHEST FAIL RATE – DEFECT        │
│ SYNTAX ELEMENTS   420                                               │
└─────────────────────────────────────────────────────────────────────┘
  ↓
RETURN
```

START

OBTAIN SOURCE CODE PROGRAMS THAT CONTAIN ONE OF THE SYNTAX ELEMENTS OF THE SYNTAX TRANSLATION DEFECTS  502

DO FOR EACH SOURCE CODE PROGRAM X  504

TRANSFORM THE SYNTAX ELEMENT INTO A LOGICALLY-EQUIVALENT SYNTAX ELEMENT USING RULES  506

EXECUTE NEURAL TRANSCOMPILATION MODEL WITH INPUT SEQUENCE INCLUDING LOGICALLY-EQUIVALENT SYNTAX ELEMENT TO GENERATE OUTPUT SEQUENCE Y  508

GENERATE FINE-TUNING SAMPLE WITH SOURCE CODE PROGRAM AND MODEL-GENERATED OUTPUT SEQUENCE (X,Y)  510

RETURN

*FIG. 5*

SYNTAX UNIT TESTING AND FINE-TUNING OF NEURAL TRANSCOMPILATION MODELS

BACKGROUND

Transcompilation is the translation of a source code program written in one high-level source code programming language into a source code program of a different high-level programming language. Neural machine language models have been utilized as transcompilation models to automate the translation of source code written in a source programming language into a different target programming language while preserving the function of the source code. Neural transcompilation models or neural transcompilers are beneficial for programs written in legacy programming languages, such as the Common Business Oriented Language (COBOL) or Python 2, that have few developers familiar with the programming language or which are obsolete.

A neural transcompilation model should preserve the function of the source code program and follow the syntax of the translated programming language. However, at times, some neural transcompilation models make elementary syntax errors which occur when the source programming language uses a syntax element not present in the target programming language.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A neural transcompilation model that translates source code of a source programming language into source code of a different, target programming language is tested with a set of syntax unit tests to determine the syntax elements of the source programming language that fail to translate properly in a target programming language. The neural transcompilation model is then fine-tuned with training samples of the syntax elements having the highest failure rate and their paired correct translation in order to teach the model to learn the association between the poorly understood syntax element and its correct translation in the target programming language.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 4 is a flow diagram illustrating an exemplary method of detecting syntax translation defects.

FIG. 5 is a flow diagram illustrating an exemplary method of generating a supervised training dataset from the detected syntax translation defects.

DETAILED DESCRIPTION

Overview

Aspects of the present disclosure pertain to training a neural transcompilation model with synthetically-created parallel training data to learn to generate syntactically-correct translations. The neural transcompilation model is executed with test programs which leverage the basic syntax structure of a source programming language along with unit test cases to verify the correctness of a translation generated by the model into the target programming language. A syntax defect is a syntax element that the neural transcompilation model fails to correctly translate into the target programming language thereby producing an incorrect translation. The most significant syntax defects are identified for the neural transcompilation model. Synthetically-generated parallel training data is created based on the most significant syntax defects to fine-tune the neural transcompilation model to learn to produce syntactically-correct translations in the target programming language.

Consider the following source code program written in the C++ programming language:

```
int foo (int a)
{
    int b = ++a;
    return b;
}
```

A neural transcompilation model translates the C++ source code above into the following Python source code:

```
def foo (a) :
    b = yield a
    return b
```

The neural transcompilation model interprets the prefix increment in the C++ program, ++a, as yield a in Python which is incorrect. This type of syntax error occurs in translations when the source programming language uses a syntax element not present in the target programming language. This type of erroneous translation is likely attributable to the lack of parallel training data used to train the neural transcompilation model. Parallel training data includes source code written in a source programming language and its corresponding translation in the target programming language.

The technique described herein improves the model's understanding of the syntax defects with a few examples of supervised training data to obtain correct translations. Often transcompilation models are trained using parallel training data which may not be enough for the model to learn how to translate syntax elements not present in a target programming language. The additional training costs are modest compared with the cost of pre-training the model on the source code of the source and target programming languages.

Attention now turns to a more detailed description of the components, methods, processes, and system for creation of a deep learning model for code review tasks.

System

Figure 1:
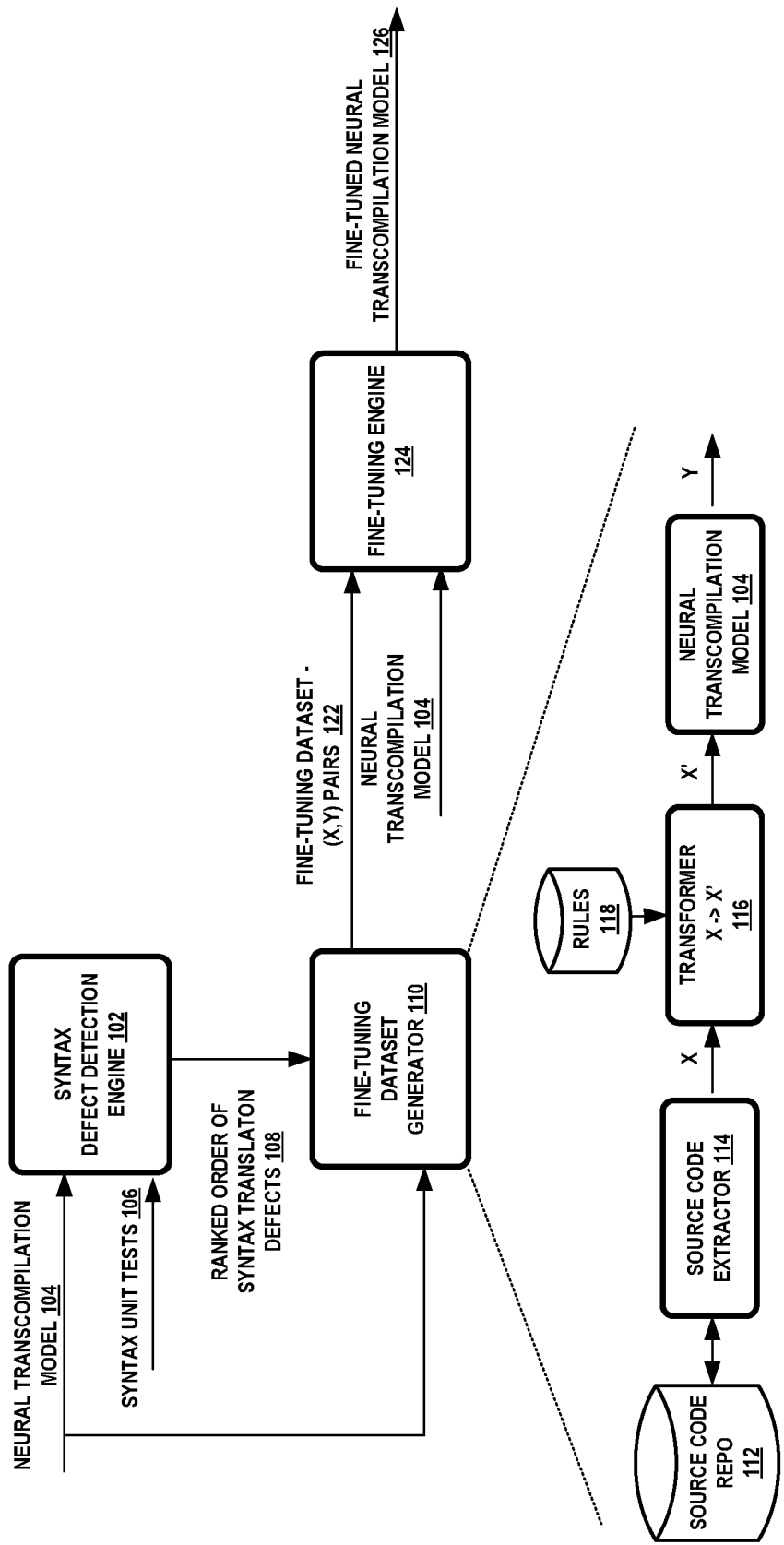
FIG. 1 is a schematic diagram illustrating an exemplary system for the syntax unit testing and fine-tuning of a neural transcompilation model.

FIG. 1 illustrates a block diagram of an exemplary system 100 for fine-tuning a neural transcompilation model for syntax translation defects. A syntax defect detection engine 102 executes a neural transcompilation model 104 with several syntax unit tests 106. Each syntax unit test 106 is designed to test a particular syntax element of a particular programming language. Multiple syntax unit tests 106 are applied to the neural transcompilation model to detect syntax translation defects. The syntax defect detection engine 102 ranks the syntax translation defects based on a failure rate 108 in order identify the defects that are the most detrimental to the model's performance.

A syntax unit test 106 includes a software program and a unit test that must be satisfied. If the model fully understands a syntax element, then the model will translate the test program correctly and pass the unit tests. Each syntax unit test 106 includes the name and category of the syntax element of the source programming language, a source program to translate, the input of the source code to translate and the expected output of the translated code.

For example, the syntax unit test for the prefix increment operator in C++ which includes the following source code in C++, an input list and the expected output:

```
int foo (int a) {
  int b = ++a;
  return b;
}
```

The input list is [1, 2, 3] and the expected output is [2, 3, 4]. The translated source code takes each value of the input list and returns an output. The translated source code is semantically-equivalent to the input source code if its output is the same as the expected output. The model passes the unit test case if it can generate a semantically-equivalent translation that produces the expected output and is syntactically-correct in the target programming language.

The following is an example of a syntax unit test for the translation of a do-while statement in Java. The syntax unit test includes the following source code, input list and output:

```
int foo (int a) {
  int i = a;
  do {
    i++;
  }
  while (i < a);
  return i;
}
```

The input list is [3] and the expected output is [4]. The model passes the unit test case if the model can generate a semantically-equivalent translation that produces the expected output and which is syntactically-correct in the target programming language.

The following is an example of a syntax unit test for the translation to a stack top in Python. The syntax element tested is the function definition, assignment operator, and class method invocation. The principal syntax element being tested in this example is the class method invocation '.append( )'. The syntax unit test includes the following source code, input list and output:

```
def foo( );
  s = [ ]
  s.append(1)
  s.append(2)
  s.append(3)
  return s[-1]
```

The input list is [ ] and the output list is [3]. The model passes the unit test case if the model can generate a semantically-equivalent translation that produces the expected output without syntax errors in the target programming language.

A syntax element is an element of the grammar of the programming language that is represented as a terminal node of a concrete syntax tree. In an aspect, the techniques herein may be applied to an ordered sequence of syntax elements. In the C++ programming language, syntax elements include an expression, an operator, a variable, etc.

A neural transcompilation model 104 is a deep learning model capable to translating a source code program or snippet written in one high-level programming language into a semantically-equivalent source code program or snippet in a different high-level programming language. The neural transcompilation model differs from translating source code into an intermediate code representation (e.g., byte codes) or machine language instructions.

A high-level programming language differs from a low-level programming language such as assembly language. A low-level programming language is designed to operate the hardware and instruction set architecture of the computer directly. A high-level programming language abstracts the hardware and instruction set architecture of the computer into variables, arrays, objects, complex arithmetic or Boolean expressions, subroutines and functions, loops, threads, locks, and the like. Examples of a high-level programming language include C++, C, C++, Fortran, ADA, Algol, COBOL, Python, JavaScript, Visual Basic, Delphi, Perl, PHP, Pascal, Ruby, Java, and ECMAScript. Examples of a low-level programming language include assembly language, intermediate language code, machine instructions, and bytecode.

Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

In an aspect, the neural transcompilation model 104 may be embodied as a deep learning model, such as, a neural transformer model with attention, a recurrent neural network (RNN) (e.g., long short-term memory (LSTM) network) and/or convolutional neural networks (CNN).

The fine-tuning dataset generator 110 generates a training dataset of pairs of training samples (X, Y) 122 where X represents a source code program using a syntax element not known in the target programming language and Y represents a source code program in the target programming language having a correct translation. The fine-tuning dataset generator 110 includes one or more source code repositories 112, a source code extractor 114, a transformer 116, and a set of rules 118. The source code extractor 114 extracts source code snippets from one or more source code repositories 112 having the syntax element of the highest-ranked syntax translation defects 108. These source code snippets are the first portion of the pair, X. The transformer 116 modifies the source code snippet of the source programming language having the syntax element into a logically-equivalent element of the target programming language thereby generating source code snippet X'. The neural transcompilation model receives the input sequence X' and generates the translation Y. The fine-tuning dataset generator forms the pair (X, Y) and includes the pair into the fine-tuning dataset 122.

The pairs (X, Y) of the fine-tuning dataset are then used by the fine-tuning engine 124 to fine-tune the neural transcompilation model 126. Fine-tuning is a training process of the neural transcompilation model with supervised data. Supervised data is data that is tagged with the correct data, such as including the source code snippet with the syntax translation defect in a source programming language and the syntactically-correct translation in the target programming language. Supervised data differs from unsupervised data that does not contain the syntactically-correct translation.

Neural Transformer Model with Attention

In an aspect, the neural transcompilation model may be implemented as a neural transformer model with attention. A neural transformer model with attention is one distinct type of deep learning model that utilizes an attention mechanism to relate different positions of a single input sequence in order to compute a representation of the input sequence.

In an aspect, the neural transformer model with attention in an encoder-decoder configuration. The encoder reads the source code program in the source programming language and generates a representation of it. The decoder generates a translation in a target programming language autoregressively, one token at each time step.

Figure 2:
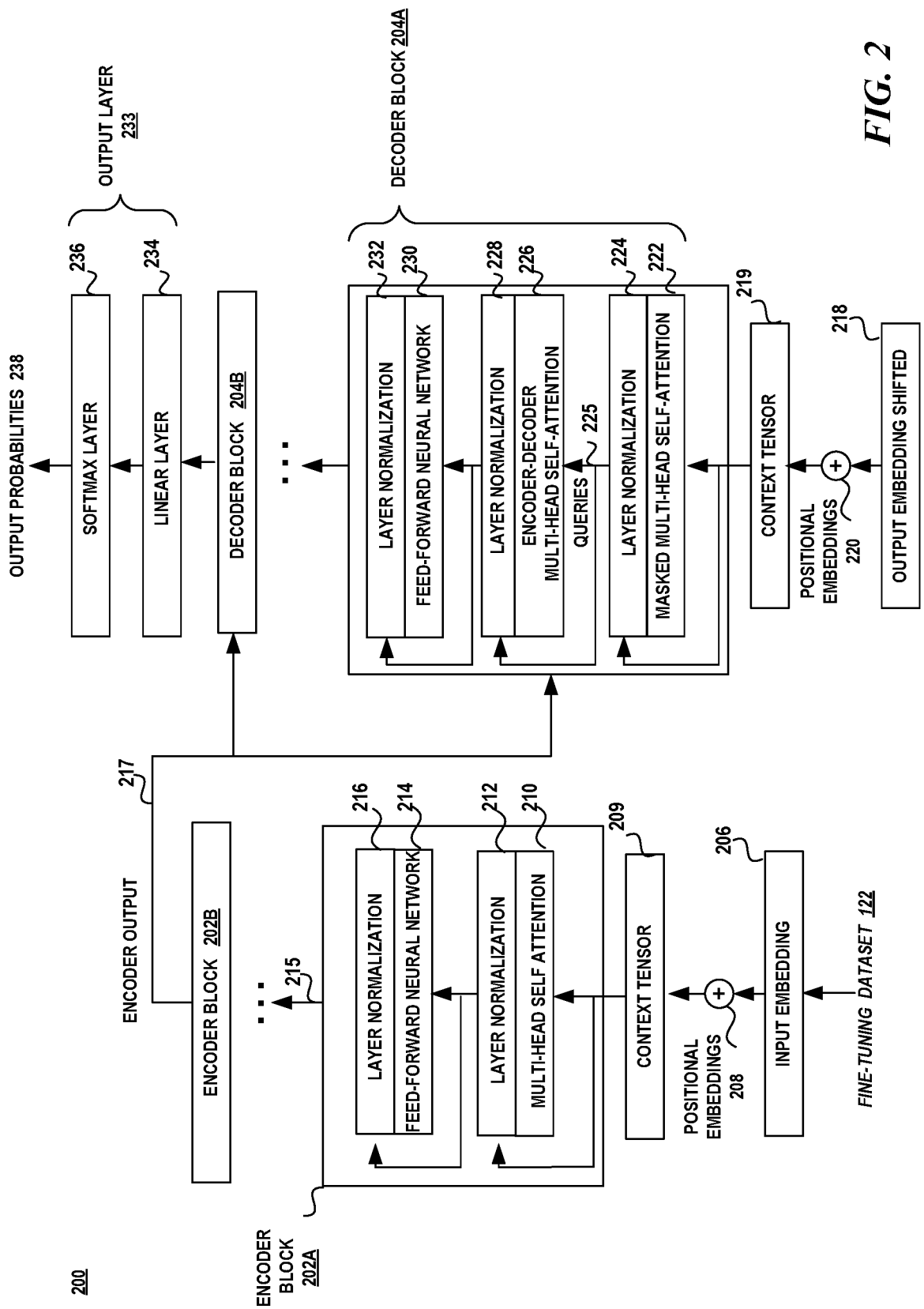
FIG. 2 is a schematic diagram illustrating an exemplary neural transcompilation model configured as a neural transformer model with attention.

FIG. 2 shows an exemplary structure of the neural transformer model with attention in an encoder-decoder configuration. The neural transformer model 200 contains one or more encoder blocks 202A, 202B coupled to one or more decoder blocks 204A, 204B. The initial inputs to the first encoder block 202A are the input embeddings 206 of an input sequence of a fine-tuning dataset 122. In order to retain the order of the tokens in the input embedding 206, positional embeddings 208 are added to the input embedding 206 forming a context tensor 209. The initial inputs to the first decoder block 204A are a <START> token and thereafter a shifted sequence of the output embeddings 218 from a previous time step to which the positional embeddings 220 are added forming context tensor 219.

An encoder block 202A, 202B consists of two layers. The first layer includes a multi-head self-attention component 210 followed by layer normalization component 212. The second layer includes a feed-forward neural network 214 followed by a layer normalization component 216. The context tensor 209 is input into the multi-head self-attention component 210 of the first encoder block 202A with a residual connection to the layer normalization component 212. The output of the layer normalization component 212 is input to the feed-forward neural network 214 with another residual connection to layer normalization component 216. The output of the encoder block 202 is a set of hidden representations 215. The set of hidden representations 215 is then sent through additional encoder blocks. At the last encoder block, the set of hidden representations 217 is sent to each decoder 204.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identify the relationships between tokens in the long sequence while ignoring other tokens that do not have much bearing on a given prediction.

The multi-head self-attention component 210 takes a context tensor 209 and weighs the relevance of each token represented in the context tensor 209 to each other by generating attention weights for each token in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right) V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with dr output values which are concatenated to a final value:

$$\text{MultiHead}(Q,K,V) = \text{Concat}(\text{head}_1, \ldots, \text{head}_h)W^O,$$

where $\text{head}_i = \text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization components 212, 216 normalize the inputs across the features. The mean and standard deviation is computed across the feature dimensions.

The feed-forward neural network 214 processes each output encoding separately. The output of the top encoder block is a set of attention vectors K and V 217 which is used by the encoder-decoder multi-head self-attention layer 226 of each decoder block 204.

The decoder block 204A, 204B predicts each token $t_i$ in the target programming language one-by-one at each time step conditioned on all previously-generated target tokens $t_1$, ... $t_{i-1}$. A decoder block 204A, 204B consists of three layers. The first layer includes a masked multi-head self-attention component 222 followed by a layer normalization component 224. The output of the layer normalization component is input into the encoder-decoder multi-head self-attention component 226 with a residual connection to layer normalization component 228. The second layer includes an encoder-decoder multi-head self-attention component 226 followed by a layer normalization component 228. The third layer includes a feed-forward neural network 230 followed by a layer normalization component 232. The output of layer normalization component 232 is input into the feed-forward neural network 230 with a residual connection to layer normalization component 232.

The masked multi-head self-attention component 222 receives the output embeddings of the previous timestep. The masked multi-head self-attention component 222 masks the output embeddings from future time steps. The encoder-decoder multi-head self-attention layer 226 receives queries from the previous decoder layer and the memory keys and values 217 from the output of the last encoder block. In this manner, the decoder block 204 can attend to every position of the input sequence. The feed-forward neural network 230 processes each output encoding separately. A layer normalization component 224, 228, 232 is used between the layers in order to normalizes the inputs across the features.

The output layer 233 includes a linear layer 234 and a softmax layer 236. The linear layer 234 is a neural network that receives the unscaled output of the last decoder block 204B and turns them into logits. A logit is an unnormalized prediction of the feed-forward output from the last decoder block. The softmax layer 236 applies the softmax function to the logits of the linear layer to approximate a probability distribution for the model's vocabulary. The probability distribution is used to predict the next token to succeed in the output sequence.

Methods

Attention now turns to a more detailed description of the methods used in the system for the syntax unit testing and fine-tuning of transcompilation models. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
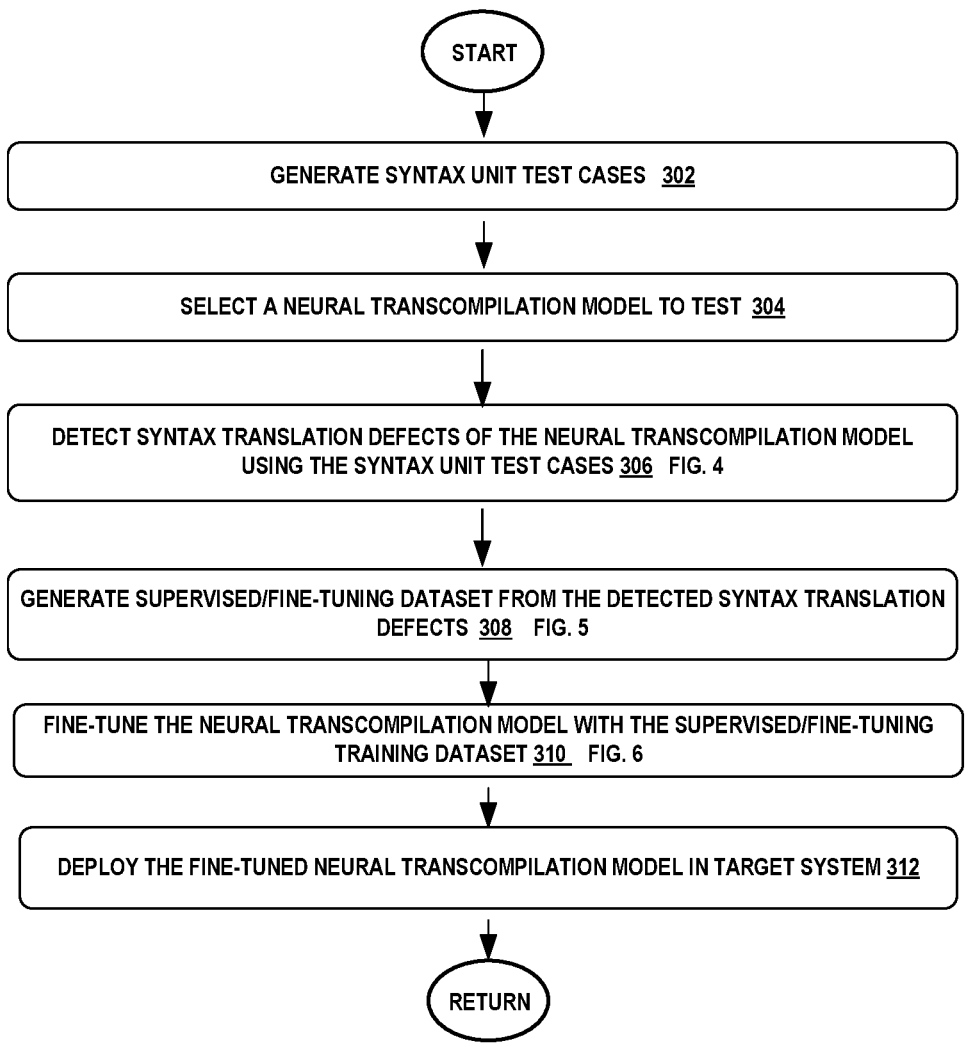
FIG. 3 is a flow diagram illustrating an exemplary method of performing the syntax unit tests and fine-tuning the model with the fine-tuning dataset.

FIG. 3 illustrates an exemplary method 300 for the syntax unit testing and fine-tuning of the neural transcompilation models. Turning to FIG. 3, several syntax unit test cases are generated to detect the syntax elements of a source programming language that are not properly translated into a source code program of a target programming language (block 302). A syntax unit test includes a name and category of the syntax element being tested, a source code program written in source programming language that the model will translate into a target programming language, the input values of the translated source code program, and the expected output from the translated program.

A neural transcompilation model is selected for testing (block 304). The syntax unit tests are applied to the neural transcompilation model to detect syntax translation defects producing syntax errors in the translations (block 306). A fine-tuning dataset is generated based on the syntax translation defects ranked with the highest failure rates (block 308). The neural transcompilation model is then fine-tuned with the fine-tuning dataset (block 310) and then deployed in a target system (block 312).

In an aspect, the syntax unit testing and fine-tuning techniques described herein may be part of a source code development environment, such as an integrated development environment (IDE). The IDE provides the transcompilation model as a tool to translate portions of source code or source code programs into another high-level programming language (block 312). Alternatively, the transcompilation model may be a web service or part thereof that facilitates the translations of programs written in legacy programming languages into a modern programming language (block 312).

FIG. 4 is an exemplary method 400 illustrating the detection of syntax translation defects using the syntax test unit cases. Turning to FIG. 4, the source code program of each syntax unit test (block 402) is parsed into a concrete syntax tree (block 404). A concrete syntax tree is a representation of the source code program in terms of the grammar of the programming language. The terminal nodes of the concrete syntax tree identify the syntax elements contained in the program. A matrix Aij is constructed which tracks each syntax element j contained in each syntax unit test i (block 406). Initially, the values of Aij are set to 0. Aij is set to 1 if the syntax unit test i contains syntax element j (block 406).

For each syntax unit test (block 408), the source code program of each syntax unit test is input into the neural transcompilation model for the model to generate a translation (block 410). The translated source code is tested with the values of the input list and the output from the translated source code is compared with the expected output (block 412). If the output from the translated source code matches the expected output, then the test passed and the matrix $y_i$ is set to 1 (block 414). Otherwise, the test failed and the matrix $y_i$ is set to 0 (block 414). When each of the syntax unit tests are completed, the fail rate of each syntax element j is determined (block 416).

In order to determine the fail rate of syntax element j, the relationship y=Ax is computed, where $y_i$=log P (fail test i) is the empirical log fail rate of test i, $x_j$=log P (fail syntax element j) is the unknown fail rate of syntax element j and A is the known relationship between test i and syntax element j (block 416). Then Lasso regression is applied to get consistent results for the estimated log fail rate of each syntax element (block 416).

The log fail rates for each syntax element are ranked from highest to lowest (block 418). The top-k syntax elements having the highest log fail rates are selected, where k is a user-defined setting (block 420). The fine-tuning dataset that is generated includes the top-k syntax elements having the highest fail rate (block 420).

FIG. 5 is an exemplary method 500 for generating the fine-tuning dataset based on the top-k syntax translation defects. Turning to FIG. 5, source code programs written in a source programming language that contain a syntax element of the top-k syntax translation defects is obtained from one or more source code repositories (block 502). This source code program is considered the first portion of the training sample pairs, X.

For each source code program (block 504), the syntax element having the syntax translation defect is translated into a logically-equivalent syntax element of the target programming language (block 506). A set of rules is used to transform the syntax element of the syntax translation defect of the source programming language into the logically-equivalent syntax element of the target programming language (block 506). For example, consider the following source code program written in C++ which is to be translated into Python:

```
int foo (int a) {
    int b = ++a;
    return b;
}
```

The prefix operator, ++a, is not present in Python. This can cause the source code program to be translated improperly because the training data did not possess enough examples mapping the prefix operator in C++ to an equivalent Python program.

The transformation is applied to the input C++ before inputting it into the neural transcompilation model which brings the C++ closer to a correct Python syntactic representation, for example:

```
int foo (int a) {
    a += 1;
    int b = a;
    return b;
}
```

The translation model generates a correct Python implementation of the C++ input, such as:

```
def foo ( a ) :
    a += 1
    b = a
    return b
```

The source programming language with the transformed element, X', is then input into the neural transcompilation model to generate a translation in the target programming language and is referred to as Y (block 508).

A fine-tuning paired sample (X, Y) is generated composed of the source code program having the syntax element of the syntax translation defect, X, and the translation generated by the neural transcompilation model, Y. The neural transcompilation model is then fine-tuned with a fine-tuning dataset of the paired samples in order to teach the neural transcompilation model to lean to translate the source code program X into the translated program Y thereby helping the model associate the syntax element of the syntax translation defect with a proper translation in the target programming language (block 510).

Figure 6:
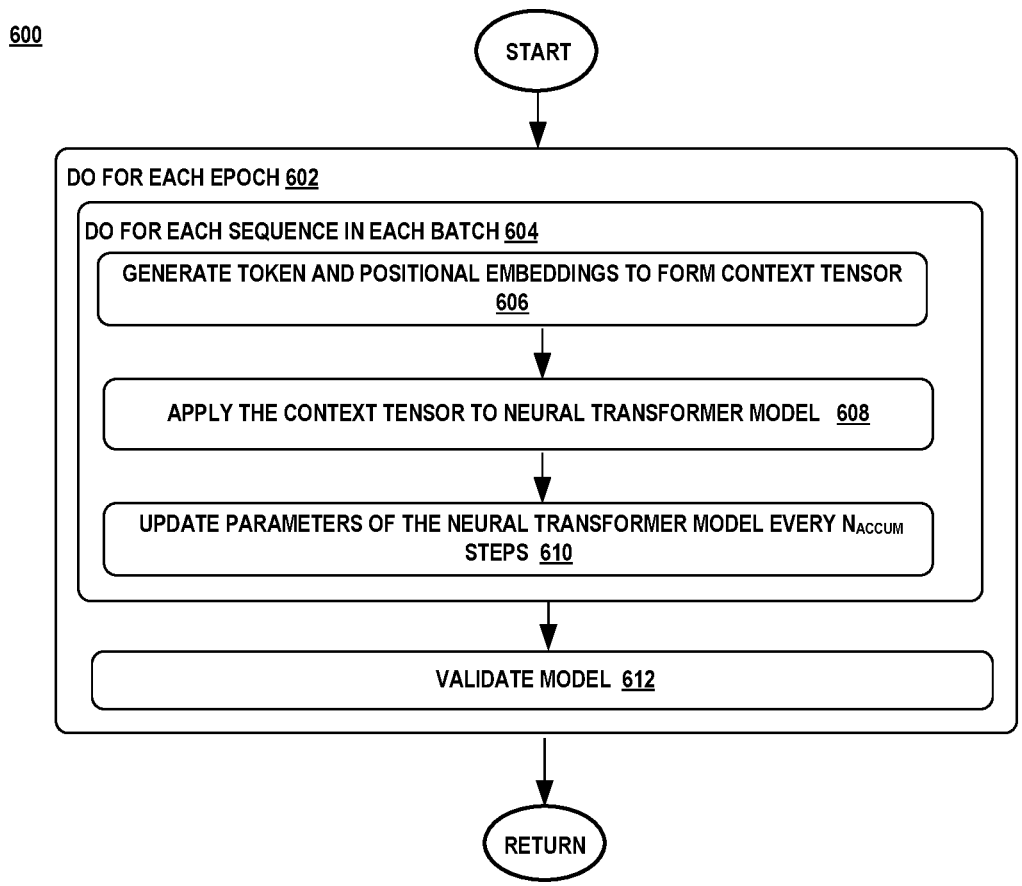
FIG. 6 is a flow diagram illustrating an exemplary method of fine-tuning a neural transcompilation model with the supervised training dataset.

Attention now turns to FIG. 6 which illustrates an exemplary method 600 of fine-tuning the neural transcompilation model.

Pre-training is the process where the model's parameters (e.g., embeddings, weights, biases) are learned from unsupervised data. The model learns the parameters through the optimization of the cost function used by the neural network layer of the model. The cost function determines the error loss from the previous epoch which is then backpropagated to the preceding layers of the model. The model's parameters are updated through backpropagation based on the error loss determined by the cost function.

The optimization of the cost function used in the neural network layer of the model determines the error loss from the previous epoch which is then backpropagated to the preceding layers of the model. The model's parameters are updated through backpropagation based on the error loss determined by the cost function. Once the model is fully trained, the model's embeddings are stored in a separate data structure and used in the inference process to transform an input sequence of tokens into a sequence of input embeddings. Each token in an input sequence is converted into its corresponding embedding resulting in the sequence of input embeddings that is applied to the model.

Fine-tuning is the process where the model's parameters are learned or updated from supervised data. Pre-training and fine-tuning are both training processes. A model may be trained through pre-training, fine-tuning, or any combination thereof. The model may have had a previous training phase that consisted of pre-training the model with unsupervised data, fine-tuning the model with supervised data, or any combination thereof.

Each of the fine-tuning samples of a fine-training dataset is an input sequence that is transformed into a sequence of input embeddings. The input sequence is tokenized and each token in replaced with a respective embedding transforming the input sequence into a sequence of input embeddings. An embedding is a learned representation for the text-based tokens where tokens that have a common meaning have a common representation. An embedding is a mapping of discrete categorical variables to a vector of continuous numbers. There is an embedding for each token of the source code used in the fine-tuning dataset. Each token embedding has a corresponding positional embedding. The neural transformer model does not read each token sequentially and as such, has no knowledge of the token's position in a sequence without additional position information. The positional embedding is used to encode position information about a token's position in a sequence into the neural transformer model.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

Neural transformer models are trained iteratively, making multiple passes over the pre-training dataset before converging to a minimum. An epoch represents the entire pre-training dataset passed forwards and backwards through the neural transformer blocks once. Since the pre-training dataset is very large, it is partitioned into smaller batches. The training is iterative and the entire pre-training dataset is passed through the neural transformer in multiple iterations. Each training iteration includes forward propagation, loss calculation, backpropagation steps followed by updating the weights. The training dataset is partitioned into batches with each batch of sequences running through the pre-training process.

The neural transformer model has multiple blocks and layers so that more detailed relationships within the data is learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

Referring to FIGS. 2 and 6, for each input sequence of each batch in each epoch (blocks 602, 604), the T-ordered sequences of tokens are then mapped into numeric vectors and then into respective token embeddings and positional embeddings (block 606).

Initial values are generated for the token embedding and positional embeddings of each input sequence which are then used to form a context tensor. Thereafter, the neural transformer model learns the values for each embedding through backpropagation. Upon the completion of the training phase, the embeddings for each token and the positional embeddings are saved into respective matrices for later use. There is a token embedding matrix, We, that contains an embedding vector for each token $t_i$, i=0 ... V of a particular programming language, and a positional embedding matrix, Wp, that contains an embedding vector $P_j$, j=0 ... T, for each position, where V is the size of the vocabulary for a particular programming language and T is the length of the token sequence. (Collectively, block 606).

The first encoder block 202A of the neural transformer model 200 takes the context tensor 209 as input and passes it through the multiple layers of multi-head self-attention, layer normalization and feed-forward neural network to finally produce a set of hidden representations If there are additional encoder blocks, the output of each encoder block is passed onto the next encoder block with the output of the last encoder block producing the set of hidden representations 217. The set of hidden representations 217 is passed onto each decoder block 204A, 204B. (Collectively, block 608).

The first decoder block 204A of the pre-trained neural transformer model takes a shifted sequence of an output embedding as input. The masking in the masked multi-head attention layer 222 is used to prevent positions from attending to subsequent positions in the future. The masking combined with the output embeddings shifted by one position ensures that the predictions to position T depend only on the known outputs at positions less than T. Starting with the first token of the output sequence, the tokens are passed through the self-attention 222 and normalization layers 224 and into the encoder-decoder multi-head self-attention layer 226, serving as the query for encoder-decoder self-attention, where the key and value pairs for the attention are the outputs of encoder 217. The encoder output was calculated with the entire input embedding sequence. (Collectively, block 608).

The feed forward neural networks in the encoder blocks 202A, 202B and the decoder blocks 204A, 204B are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 608).

The output layer 233 generates output probabilities 238 of each token in the model's vocabulary. The model's vocabulary consists of tokens from the source code programs used to train the model. (Collectively, block 608).

At the completion of each batch, the parameters of the neural transformer model are updated at a preconfigured frequency denoted as Naccum. Naccum is a gradient accumulation frequency and in one aspect has a value of 8. The parameters include the token embeddings and the positional embeddings which are stored in a respective embedding matrix. (Collectively, block 610).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 612).

Exemplary Operating Environment

Figure 7:
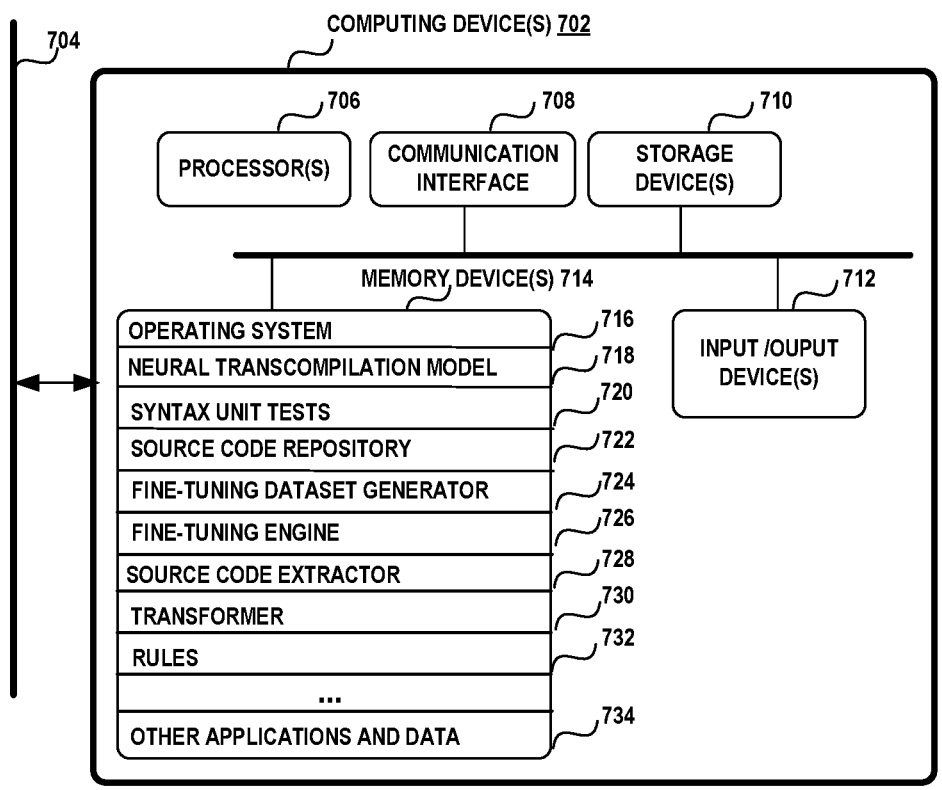
FIG. 7 is a block diagram illustrating an exemplary operating environment.

Attention now turns to a discussion of an exemplary operating environment 700. FIG. 7 illustrates an exemplary operating environment 700 in which one or more computing devices 702 are used to perform the syntax unit testing and fine-tune the neural transcompilation model. However, it should be noted that the aspects disclosed herein is not constrained to any particular configuration of the computing devices. In another aspect, one or more computing devices may be configured to perform the syntax unit testing and one or more other computing devices may be configured to fine-tune the neural transcompilation model.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing device 702 may include one or more processors 706, one or more communication interfaces 708 one or more storage devices 710, one or more memory devices or memories 714, and one or more input/output devices 712. A processor 706 may be any commercially available or customized processor and may include dual microprocessors and multi-processor architectures. A communication interface 708 facilitates wired or wireless communications between the computing device 702 and other devices. A storage device 710 may be computer-readable medium that does not contain propagating signals, such as modulated data signals transmitted through a carrier wave. Examples of a storage device 710 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 710 in the computing devices 702. The input/output devices 712 may include a keyboard, mouse, pen, voice input device, touch input device, display, speakers, printers, etc., and any combination thereof.

A memory device or memory 714 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 714 may also include one or more external storage devices or remotely located storage devices that do not pertain to propagated signals, such as modulated data signals transmitted through a carrier wave.

A memory device 714 may contain instructions, components, and data. A component is a software program that performs a specific function and is otherwise known as a module, program, and/or application. The memory device 714 may include an operating system 716, a neural transcompilation model 718, syntax unit tests 720, one or more source code repositories 722, fine-tuning dataset generator 724, fine-tuning engine 726, source code extractor 728, transformer 730, rules 732, and other applications and data 734.

A computing device 702 may be communicatively coupled via a network 704. The network 704 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 704 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of fine-tuning a neural transcompilation model to associate poorly understood syntax elements of one programming language into a syntactically-proper translation on a target programming language. The technical effect achieved is the enhanced accuracy of the translated source code without undue increased computational burden. The failure rate of the defective syntax elements is computed to select those syntax elements having the highest failure rate. The fine-tuning requires a few fine-tuning samples of the syntax elements having the highest failure rate to teach the model to learn to generate the correct translations.

CONCLUSION

A system is disclosed comprising: a processor and a memory. The memory stores a program configured to be executed by the processor. The program comprises instructions that when executed by the processor perform actions that: obtain a syntax unit test, wherein the syntax unit test comprises a first source code program written in a first programming language; execute a neural transcompilation model to generate a translation of the first source code program into a second programming language, wherein the first programming language differs from the second programming language; determine a syntax translation defect in the translation generated by the neural transcompilation model, wherein a syntax translation defect represents a syntax element of the first programming language that the neural transcompilation model fails to translate into the second programming language; and fine-tune the neural transcompilation model on a training dataset that includes source code program of the first programming language having the syntax translation defect with a syntactically-correct translation in the second programming language.

In an aspect, the program comprises instructions that when executed by the processor perform actions that: deploy the fine-tuned neural transcompilation model in an integrated development environment. In an aspect, the program comprises instructions that when executed by the processor perform actions that: execute the translation of the first source code program with input values to obtain an output; and detect a syntax translation defect when the output from execution of the syntax unit test with the input values differs from an expected output.

In an aspect, the program comprises instructions that when executed by the processor perform actions that: transform the syntax element of the first source code program associated with the syntax translation defect into a syntactically-correct syntax element in the second programming language; and generate the syntactically-correct translation in the second programming language from execution of the neural transcompilation model with the first source code program having the syntax translation defect.

In an aspect, the neural transcompilation model includes a recurrent neural network (RNN). In an aspect, the neural transcompilation model includes a convolutional neural network (CNN). In an aspect, the neural transcompilation model includes a neural transformer model with attention.

A computer-implemented method is disclosed comprising: obtaining a plurality of syntax unit tests of a first programming language; generating a translation of each of the plurality of unit tests into a second programming language using a neural transcompilation model given each of the plurality of unit tests; detecting one or more syntax translation defects in the translations, wherein a syntax translation defect represents a syntax element of the first programming language that the neural transcompilation model fails to translate into the second programming language; and training the neural transcompilation model on a training dataset that includes a source code program having the syntax translation defect paired with a corresponding syntactically-correct translation in the second programming language.

In an aspect, the computer-implemented method further comprises: executing each of the syntax unit tests with input values to obtain an output; comparing the output of each syntax unit test with an expected output associated with the syntax unit test; and detecting a syntax translation defect when the output from execution of the syntax unit test with the input values differs from the expected output.

In an aspect, the computer-implemented method further comprises: computing a failure rate for each syntax translation defect; and ranking each syntax translation defect based on the failure rate of all the syntax translation defects.

In an aspect, the computer-implemented method further comprises: selecting a subset of the syntax translation defects based on highest failure rates. In an aspect, the computer-implemented method further comprises: generating the training dataset with paired training samples, a paired training sample including a source code program having a syntax element of the subset of syntax translation defects and a corresponding translation in the second programming language.

In an aspect, the computer-implemented method further comprises: associating each syntax unit test with input values and an expected output. In an aspect, the neural transcompilation model comprises a neural transformer model with attention or a recurrent neural network (RNN). In an aspect, the neural transcompilation model executes in an integrated development environment.

One or more hardware storage devices is disclosed having stored thereon computer executable instructions that are structured to be executable by one or more processors of a computing device to thereby cause the computing device to: execute a neural transcompilation model with each of a plurality of syntax unit tests written in a first programming language, wherein the neural transcompilation model translates each syntax unit test into a translated source code program in a second programming language, wherein the first programming language and the second programming language differ; identify a syntax translation defect in at least one translated source code program, wherein the syntax translation defect is associated with a syntax element of the first programming language that failed to translate into a syntactically-correct syntax element of the second programming language; create a training dataset of source code programs in the first programming language having the identified syntax translation defect with a correct translation in the second programming language; and train the neural transcompilation model with the training dataset to learn to translate syntax elements of the first programming language into syntactically-correct syntax elements of the second programming language.

In an aspect, the one or more hardware storage devices have stored thereon further computer executable instructions that are structured to be executable by one or more processors of the computing device to thereby cause the computing device to: modify the syntax unit test with the identified syntax element with a syntactically-correct syntax element in the second programming language; and generate the correct translation in the second programming language from execution of the neural transcompilation model given the modified syntax unit test.

In an aspect, the one or more hardware storage devices have stored thereon further computer executable instructions that are structured to be executable by one or more processors of the computing device to thereby cause the computing device to: compute a failure rate for each syntax translation defect; and rank each syntax translation defect based on a highest failure rate.

In an aspect, the training dataset includes source code programs in the first programming language having highest failure rates. In an aspect, the neural transcompilation model comprises a neural transformer model with attention or a recurrent neural network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
   a processor and a memory;
   wherein the memory stores a program configured to be executed by the processor,
   wherein the program comprises instructions that when executed by the processor perform actions that:
   obtain a syntax unit test, wherein the syntax unit test comprises a first source code program written in a first programming language and a unit test;
   execute a neural transcompilation model, given the syntax unit test, to generate a translation of the first source code program into a second programming language, wherein the first programming language differs from the second programming language;
   determine a syntax translation defect in the translation of the first source code program into the second programming language generated by the neural transcompilation model, wherein the syntax translation defect represents a syntax element of the first programming language that the neural transcompilation model fails to translate into the second programming language; and
   fine-tune the neural transcompilation model on a training dataset that includes the first source code program of the first programming language having the syntax translation defect with a semantically-equivalent translation that is syntactically-correct in the second programming language.

2. The system of claim 1, wherein the program comprises instructions that when executed by the processor perform actions that:
   deploy the fine-tuned neural transcompilation model in an integrated development environment.

3. The system of claim 1, wherein the program comprises instructions that when executed by the processor perform actions that:
   execute a translation of the first source code program with input values to obtain an output; and
   detect the syntax translation defect when the output from execution of the syntax unit test with the input values differs from an expected output.

4. The system of claim 1, wherein the program comprises instructions that when executed by the processor perform actions that:
   transform the syntax element of the first source code program associated with the syntax translation defect into a syntactically-correct syntax element in the second programming language; and
   generate the semantically-equivalent translation that is syntactically-correct in the second programming language from execution of the neural transcompilation model with the first source code program having the syntax translation defect.

5. The system of claim 1, wherein the neural transcompilation model includes a recurrent neural network (RNN).

6. The system of claim 1, wherein the neural transcompilation model includes a convolutional neural network (CNN).

7. The system of claim 1, wherein the neural transcompilation model includes a neural transformer model with attention.

8. A computer-implemented method comprising:
  obtaining a plurality of syntax unit tests of a first programming language;
  generating a translation of each of the plurality of syntax unit tests of the first programming language into a second programming language using a neural transcompilation model given each of the plurality of syntax unit tests of the first programming language;
  detecting one or more syntax translation defects in the translations, wherein a syntax translation defect represents a syntax element of the first programming language that the neural transcompilation model fails to translate into a semantically-equivalent translation that is syntactically-correct in the second programming language; and
  training the neural transcompilation model on a training dataset that includes a source code program having at least one syntax translation defect paired with a semantically-equivalent translation in the second programming language that is syntactically-correct.

9. The computer-implemented method of claim 8, further comprising:
  executing each of the plurality of syntax unit tests with input values to obtain an output;
  comparing the output of each syntax unit test with an expected output associated with a corresponding syntax unit test; and
  detecting the one or more syntax translation defects when the output from execution of a corresponding syntax unit test with the input values differs from the expected output.

10. The computer-implemented method of claim 9, further comprising:
  computing a failure rate for each of the one or more syntax translation defects; and
  ranking each of the one or more syntax translation defects based on the failure rate of all the syntax translation defects.

11. The computer-implemented method of claim 10, further comprising:
  selecting a subset of the one or more syntax translation defects based on highest failure rates.

12. The computer-implemented method of claim 11, further comprising:
  generating the training dataset with paired training samples, a paired training sample including a source code program having a syntax element of the subset of syntax translation defects and a corresponding semantically-equivalent translation in the second programming language.

13. The computer-implemented method of claim 8, further comprising:
  associating each syntax unit test with input values and an expected output.

14. The computer-implemented method of claim 8, wherein the neural transcompilation model comprises a neural transformer model with attention or a recurrent neural network (RNN).

15. The computer-implemented method of claim 8, wherein the neural transcompilation model executes in an integrated development environment.

16. One or more hardware storage devices having stored thereon computer executable instructions that are structured to be executable by one or more processors of a computing device to thereby cause the computing device to:
  execute a neural transcompilation model with each of a plurality of syntax unit tests written in a first programming language, wherein the neural transcompilation model translates each syntax unit test of the plurality of syntax unit tests written in the first programming language into a translated source code program in a second programming language, wherein the first programming language and the second programming language differ;
  identify a syntax translation defect in at least one translated source code program in the second programming language, wherein the syntax translation defect is associated with a syntax element of the first programming language that failed to produce a semantically-equivalent translation that is syntactically-correct in the second programming language;
  create a training dataset of source code programs in the first programming language having the identified syntax translation defect with a correct semantically-equivalent translation in the second programming language; and
  train the neural transcompilation model with the training dataset to learn to translate syntax elements of the first programming language into a semantically-equivalent translation having syntactically-correct syntax elements of the second programming language.

17. The one or more hardware storage devices of claim 16, having stored thereon further computer executable instructions that are structured to be executable by one or more processors of the computing device to thereby cause the computing device to:
  modify a select syntax unit test having the syntax element with the syntax translation defect with a syntactically-correct syntax element in the second programming language; and
  generate the semantically-equivalent translation in the second programming language from execution of the neural transcompilation model given the modified syntax unit test.

18. The one or more hardware storage devices of claim 17, having stored thereon further computer executable instructions that are structured to be executable by one or more processors of the computing device to thereby cause the computing device to:
  compute a failure rate for each syntax translation defect; and
  rank each syntax translation defect based on a highest failure rate.

19. The one or more hardware storage devices of claim 17, wherein the training dataset includes source code programs in the first programming language having highest failure rates.

20. The one or more hardware storage devices of claim 16, wherein the neural transcompilation model comprises a neural transformer model with attention or a recurrent neural network.

* * * * *